Patented Sept. 30, 1941

2,257,461

UNITED STATES PATENT OFFICE 2,257,461

SODIUM PERBORATE PRODUCT

Harvey N. Gilbert and Norval D. Clare, Niagara Falls, N. Y., assignors to E. I. du Pont de Nemours & Company, Wilmington, Del., a corporation of Delaware No Drawing. Application March 23, 1940, Serial No. 325,656

4 Claims. (Cl. 23—60)

This invention relates to a new and improved form of sodium perborate and to a new method for securing the product in the new form. More particularly, it relates to the preparation of sodium perborate in the form of solid rods, strips or similar solid shapes by a process which involves melting sodium perborate and extruding the melted product through dies into an aqueous solution of sodium perborate in which the melted material may set to a solid form.

It is an object of this invention to develop a process for preparing sodium perborate tetrahydrate ($NaBO_3.4H_2O$) in the form of solid bodies of geometrical shape, such as wires, cylinders, prismatic shapes, etc. It is another object of this invention to prepare sodium perborate tetrahydrate in the specified form by melting the product under carefully controlled conditions and then extruding it through dies into a solution of sodium perborate in which it may set to solid shape.

Crystalline sodium perborate tetrahydrate, $NaBO_3.4H_2O$, melts to a clear liquid of fairly low viscosity at a temperature of approximately 64° C. This liquid is very slow to return to a solid mass on cooling, and therefore is unsuitable for casting or extruding. Since formation of a solid product after melting is extremely slow, requiring weeks or even months, it is evident that solid masses cannot be obtained by usual casting methods.

We have found that if the melted sodium perborate tetrahydrate is extruded into an aqueous solution of the same salt, preferably a saturated aqueous solution, the molten extruded product will rapidly set in the solution to a hard form. This will result in masses of sodium perborate tetrahydrate shaped in accordance with the die through which the molten salt was extruded. It is possible in this manner to produce sodium perborate in the form of wires, small cylinders, prismatic shapes, etc. Satisfactory setting of the extruded product cannot be secured in air, or by utilizing water as the setting bath, for the reason that the product will dissolve in the water substantially as promptly as it is extruded thereinto. We prefer to utilize a solution of sodium perborate tetrahydrate as the setting bath as solution of the extruded product in this liquid will only occur to the extent necessary to produce a saturated solution.

We have also found, surprisingly enough, that the rate at which the extruded product sets in the setting bath depends to a large extent on the temperature of the setting liquid. Most rapid setting occurs at temperatures of 25°–35° C., the rate of setting being slower when the setting liquid has a temperature either below 25° C. or above 35° C. Rapid setting is, of course, desirable as otherwise solution of the extruded product will occur as well as conversion of the product to a flocculent mass.

The molten product will set rapidly in the aqueous solution of sodium perborate tetrahydrate to a solid mass. In the aqueous solution of sodium perborate tetrahydrate the extruded mass will become firm enough to hold its shape very rapidly, and it will not coalesce with other extruded material.

The new product is also sodium perborate tetrahydrate, and by properly selecting the shape of the die or aperture through which it is extruded, a product of practically any rate of dissolution in water may be secured. By using a die which will give a final product of large contact area, the solid masses of sodium perborate will dissolve in water with rapidity equal to and in some instances even greater than that of the original crystalline product from which they were prepared.

It has been found that the active oxygen content of the sodium perborate is not decreased to any substantial extent by the process. The resulting product, in the form of dense masses shaped by extrusion through the die, will have substantially the same active oxygen content as the normal crystalline sodium perborate tetrahydrate.

It is obvious that various changes may be made in the process as described which would nevertheless come within the scope of the invention. The improved process and novel product forming the subject matter of my invention should not be restricted by the disclosures referring specifically to certain improved embodiments thereof, but should be interpreted in accordance with the prior art and appended claims.

We claim:

1. A process for producing sodium perborate tetrahydrate in the form of dense masses which comprises melting crystalline sodium perborate tetrahydrate and extruding the molten product through a die into an aqueous solution of sodium perborate tetrahydrate.

2. A process for preparing sodium perborate tetrahydrate in the form of dense masses of molded shape which comprises melting crystalline sodium perborate tetrahydrate and extruding the resulting molten product into an aqueous setting bath of sodium perborate tetrahydrate.

3. A process for producing sodium perborate tetrahydrate in the form of dense molded masses of geometric form which comprises melting sodium perborate tetrahydrate and extruding it through an aperture into a setting solution comprising a substantially saturated solution of sodium perborate tetrahydrate.

4. Sodium perborate tetrahydrate in the form of dense molded masses prepared by extrusion of molten sodium perborate tetrahydrate through dies into a setting bath comprising an aqueous solution of sodium perborate tetrahydrate.

HARVEY N. GILBERT.
NORVAL D. CLARE.